United States Patent [19]
Hunn

[11] Patent Number: 5,993,921
[45] Date of Patent: Nov. 30, 1999

[54] DEVICE AND METHOD FOR SEALING A MUNITION WITHIN A CANISTER UNTIL MUNITION LAUNCH

[75] Inventor: David Lynn Hunn, Kennedale, Tex.

[73] Assignee: Lockheed Martin Corporation, Bethesda, Md.

[21] Appl. No.: 08/828,798

[22] Filed: Mar. 27, 1997

[51] Int. Cl.[6] .............................. F41F 3/04; F42B 39/00
[52] U.S. Cl. ...................... 428/34.4; 428/35.7; 428/36.5; 428/43; 89/1.817; 206/3; 206/523; 220/89.2; 220/266; 220/324; 220/377; 156/69
[58] Field of Search ............ 206/3, 523; 89/1.817, 89/1.81; 428/34.4, 35.7, 36.5, 43, 34.6, 34.7; 220/377, 261, 266, 327, 89.2, 324; 156/69

[56] References Cited

U.S. PATENT DOCUMENTS

| | | | |
|---|---|---|---|
| 3,140,638 | 7/1964 | DeLuca | 89/1.817 |
| 3,742,814 | 7/1973 | Kroh | 89/1.8 |
| 3,789,729 | 2/1974 | Aupy | 89/1.8 |
| 3,962,951 | 6/1976 | Schenk | 89/1.81 |
| 3,970,006 | 7/1976 | Copeland et al. | 89/1.14 |
| 4,227,241 | 10/1980 | Marcus | 362/492 |
| 4,301,708 | 11/1981 | Mussey | 89/1.81 |
| 4,498,368 | 2/1985 | Doane | 89/1.817 |
| 4,684,571 | 8/1987 | Kunnert et al. | 428/314.8 |
| 5,375,503 | 12/1994 | Breugnot et al. | 89/1.817 |

*Primary Examiner*—Rena L. Dye
*Attorney, Agent, or Firm*—Sidley & Austin

[57] ABSTRACT

A cover for sealing a munition within a canister has an inner layer of tempered glass bonded by an adhesive to an outer layer of structural foam having at least one score mark thereon. Upon launch of the munition, the inner layer of tempered glass breaks into numerous fragments which remain bonded to the outer layer of scored foam by the adhesive layer. The outer layer of foam then breaks along its score marks into two or more pieces that have pieces of the inner layer of glass bonded thereto. The pieces of foam with glass fragments bonded thereto are then blown out and away from the canister so that the munition can egress unimpeded and undamaged from the canister. A method for sealing a munition within a canister until munition launch includes the step of sealing the munition within the canister by a cover having an inner layer of tempered glass bonded by an adhesive to an outer layer of structural foam having at least one score mark thereon. Upon munition launch, the method further includes the steps of breaking the inner layer of glass into numerous fragments, which remain bonded to the outer layer of foam by the adhesive layer; breaking the outer layer of foam along its score marks into two or more foam pieces each having glass fragments bonded thereto; and removing the pieces of foam with the glass pieces bonded thereto from the proximity of the munition. Thus, the munition can egress unimpeded and undamaged from the munition canister.

19 Claims, 3 Drawing Sheets

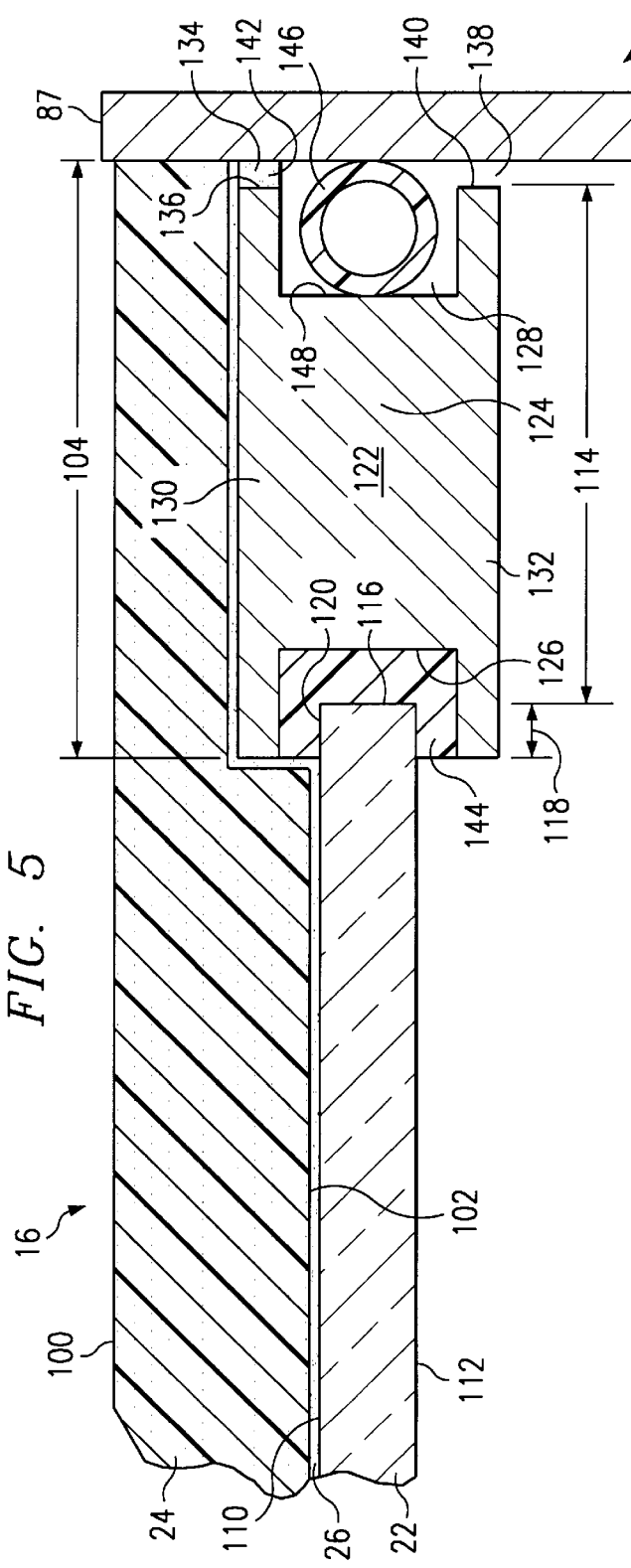
*FIG. 5*
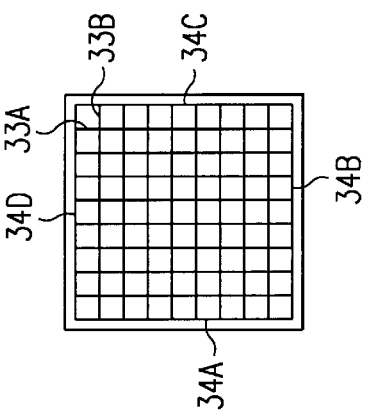
*FIG. 6C*
*FIG. 6B*
*FIG. 6A*

DEVICE AND METHOD FOR SEALING A MUNITION WITHIN A CANISTER UNTIL MUNITION LAUNCH

TECHNICAL FIELD OF THE INVENTION

This invention relates to a cover assembly for sealing a munition within a canister until the munition is launched, at which time the cover breaks apart and away from the canister thus allowing the munition to egress unimpeded and undamaged from the canister, and to a method for sealing a munition within a canister until munition launch at which time the munition can egress unimpeded and undamaged from the canister.

BACKGROUND OF THE INVENTION

Munitions such as missiles and rockets are often packaged in canisters for environmental protection, ease of handling, and efficient and long term storage. These canisters are typically round or square tubes that contain the munition, the munition launch hardware such as rails and/or sabots, and electronics for initiating the launch of the munition. In order to provide full environmental protection of the munition and these components, covers must be installed to seal the canister and thereby contain the munition and components in a completely closed environment. The cover must be able to provide environmental protection to the munition under a variety of extreme conditions, e.g., high altitude, variations in humidity, low and high temperatures, debris impact from transportation, and exposure to water. Upon initiation of a munition launch, the canister cover must be easily and quickly removed to allow unimpaired exit of the munition from the canister.

There are several types of canister covers currently utilized. For example, a flexible membrane can be stretched over a frame which is permanently attached to the canister. Upon launch initiation, the munition tears through the membrane. Disadvantages of using a membrane as a canister cover include limited durability, limited environmental protection, and inefficient storage due to the space required for the frame used to attach the membrane to the canister.

Another currently used canister cover is a hard cover made of plastic or metal, with the cover being adhesively bonded or attached to the canister. Upon launch initiation, the cover is blown off the canister by either launch pressure or the forward motion of the munition. The hard cover may be partially cut or scored to allow the cover to break into a predetermined number or size of pieces, such as into quarters or halves. Disadvantages of such a cover include the high launch pressures required to break the hard cover or to break the bond between the cover and the canister, inconsistent breaking of the bond between the cover and the canister, damage to the munition caused by impact with the cover, and damage to launch equipment caused by cover fragments.

Foamed plastic covers, comprised of a solid layer of plastic foam, are also currently utilized to cover munition canisters. Upon initiation of munition launch, the munition strikes the foamed plastic cover which then breaks into multiple pieces. Foamed plastic covers, however, provide a poor environmental seal because they are comprised of a porous material that has limited resistance to air or moisture. Furthermore, because the foamed plastic is hard and brittle, it is difficult to attach to a canister without breaking or cracking the foamed plastic.

Canister covers fabricated from glass have also been considered. Glass is low cost, lightweight and provides excellent environmental protection. Glass can be heat treated (tempered) in such a manner that it becomes frangible, i.e. a very small point load will completely shatter a large plate of the glass. Variations in the heat treatment allow the size of the shattered pieces to be predetermined and controlled. Tempered glass is often used in applications such as automobile windows or glass doors. One disadvantage of using tempered glass for canister covers is that such a cover has low overall durability, primarily due to the ease with which the glass can be shattered. Another disadvantage of tempered glass is that, even with the ability to control fragment size through heat treatment, the size of the fragments cannot be made big enough so that they do not interfere with the forward movement of the munition from the canister and do not damage the surfaces of the munition. Small fragments interfere with the egress of the munition by becoming wedged between the outer surfaces of the munition and the inner surfaces of the canister; small fragments can also scratch the outer surfaces of the munition, thereby changing the aerodynamics of the munition. In contrast, large fragments would be blown away from the canister due to pressure from the launch or from impact by the munition. It would therefore be desirable to have a glass canister cover having both high durability and large fragment size upon munition launch.

SUMMARY OF THE INVENTION

It is an object of the present invention to provide a cover for sealing a munition canister, the cover providing superior environmental protection, having high durability, and allowing the munition to egress unimpaired and undamaged from the canister. It is another objective of the present invention to provide a cover for sealing a munition canister, the cover breaking into fragments upon launch of the munition, the fragments being large enough not to interfere with the egress of the munition from the canister and being large enough not to damage the surface of the munition.

The invention is a laminate used as a cover to seal a munition in a canister. The munition canister is a hollow container with an open end for allowing egress of the munition upon munition launch. The laminate cover is comprised of an inner layer of tempered glass bonded by an adhesive layer to an outer layer of structural foam having score marks thereon. The cover is attached to the canister such that the munition is sealed within the canister. Upon munition launch, the munition impacts the inner glass layer, which breaks into numerous fragments. The glass fragments remain bonded to the outer foam layer by the adhesive layer. The outer foam layer then breaks along its score marks into large pieces, each of the large foam pieces having numerous glass fragments bonded thereto. The large foam pieces having the glass fragments bonded thereto are then blown out and away from the canister, thus allowing the munition to egress unimpeded and undamaged from the canister.

The method of sealing a munition canister until munition launch comprises sealing the munition within the canister by a cover comprised of an inner layer of tempered glass and an outer layer of structural foam bonded by an adhesive layer to said inner layer of glass, with the outer layer of foam having score marks thereon. Upon munition launch, the method further includes the steps of breaking the inner layer of tempered glass into numerous fragments, the glass fragments being bonded to the outer layer of foam by the adhesive layer; breaking the outer layer of foam along the score marks into large fragments having the numerous glass fragments bonded thereto; and removing the fragments of foam with the glass fragments bonded thereto from the proximity of the munition such that the munition can egress unimpeded and undamaged from the munition canister.

BRIEF DESCRIPTION OF THE DRAWINGS

FIG. 5 is an alternative attachment assembly for attaching a canister cover to a canister.

FIGS. 6A–6C show the structural foam layer of canister covers having different score markings.

DETAILED DESCRIPTION

Figure 1:
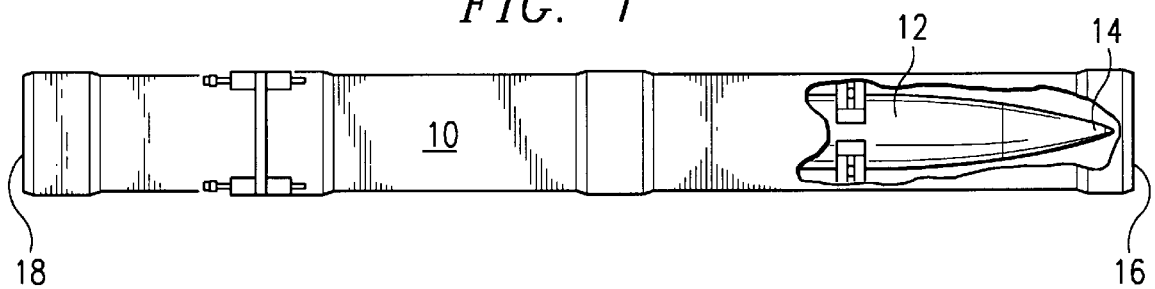
FIG. 1 is a side view of a tubular munition canister having a cut-away portion showing a munition contained within the canister.

FIG. 1 shows a side view of a hollow, tubular munition canister 10 containing a munition 12. The munition 12 has a nose 14 positioned near a front cover 16 of the canister 10. The rear of the canister is sealed with an aft cover 18. In its stored position, the munition 12 is restrained from contacting the front cover 16. Upon launch of the munition 12, the forward motion of the munition 12 causes the nose 14 to impact the front cover 16, which breaks apart and away from the munition 12, as described in more detail below.

Figure 2:
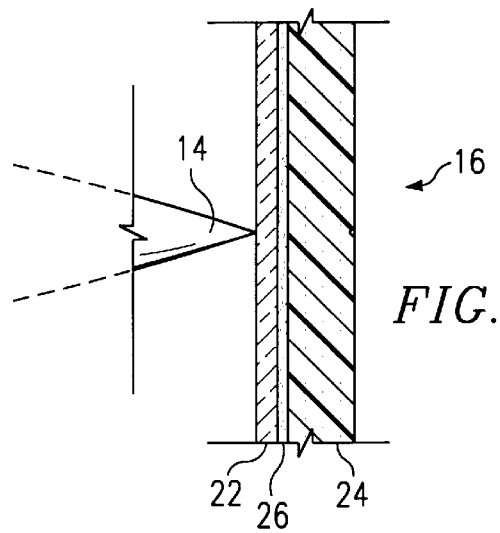
FIG. 2 is a side view of the nose of the munition and a cross sectional view of an adjacent portion of the canister cover.

FIG. 2 shows a side view of the nose 14 of the munition 12 contacting a portion of the front cover 16, which is shown in cross section. In a preferred embodiment, the cover 16 is a laminate comprised of three layers 22, 24 and 26. Layer 22 is comprised of a layer of glass that is suitably thick for providing environmental protection for the munition, has high durability, and breaks with little point load. Preferably the glass is CHEMCOR™ glass, Corning Code 0315, and has a thickness of 0.2". Corning Code 0315 glass is commercially available in sheets of 48"×60"×0.70–0.200", tubing having a diameter of up to 2"and a length of 52", or as pressured ware. Preferably, the glass is initially obtained in sheets and then cut to a size appropriate for the canister which the glass will be used to cover. The glass is also preferably heat treated, or tempered. Tempering is a process by which glass is first heated and then rapidly cooled in order to relax structural and viscomechanical stresses of the glass. As a result of thermal treatment, tempered glass is substantially stronger than regular, or annealed, glass. The strength increase of tempered glass is due to surface flaws in the glass being closed up by the surface compression of the tempering. Thus, tempered glass is better able than untreated glass to resist surface damage or failure from impact. When broken, tempered glass breaks into small particles having blunt shapes and dull edges. The size of the particles depends on the center tension of the glass, which can be controlled by the tempering process. Corning Code 0315 glass is a type of tempered glass having a shear modulus of $4.3 \times 10^6$ psi at 25° C. and a modulus of elasticity of $10.3 \times 10^6$ psi at 25° C. Thus, the layer 22 being formed of tempered glass will fragment into numerous small pieces upon impact by the nose 14 of the munition 12 during launch of the munition 12.

The second layer 24 of the cover 16 is comprised of a layer of structural foam that is suitable for protecting the glass layer 22 from environmental conditions and from failure or damage from impacts caused by sources external to the canister 10. Preferably, the layer 24 is comprised of a rigid, closed-cell foam such as LAST-A-FOAM® FR-3706. LAST-A-FOAM® FR-3706 is a CFC-free, rigid, closed-cell, flame-retardant polyurethane foam available in densities ranging from about 3 to about 40 pounds per cubic foot. The foam has a high strength to weight ratio due to its cellular strength and cross-linked resin. Also, because the foam has a closed-cell structure, it is resistant to water absorption and will not swell, crack, or split upon exposure to water. The foam is furthermore stable, inert, and resistant to most chemicals and solvents. LAST-A-FOAM® FR-3706 is commercially available in densities of about 3 to about 20 pounds per cubic foot in 48"×96" sheets, and in densities from about 10 to about 40 pounds per cubic foot in 18"×100" sheets. Preferably, foam having a density of about 6 pounds per cubic feet and a thickness of about 0.75" is purchased in 48"×96" sheets which are cut into pieces having sizes and shapes appropriate for the canister which the foam will be used to cover. Middle layer 26 is an adhesive that is suitable for bonding the glass layer 22 to the foam layer 24. Preferably, layer 26 is a commercially available epoxy film.

Figure 3:
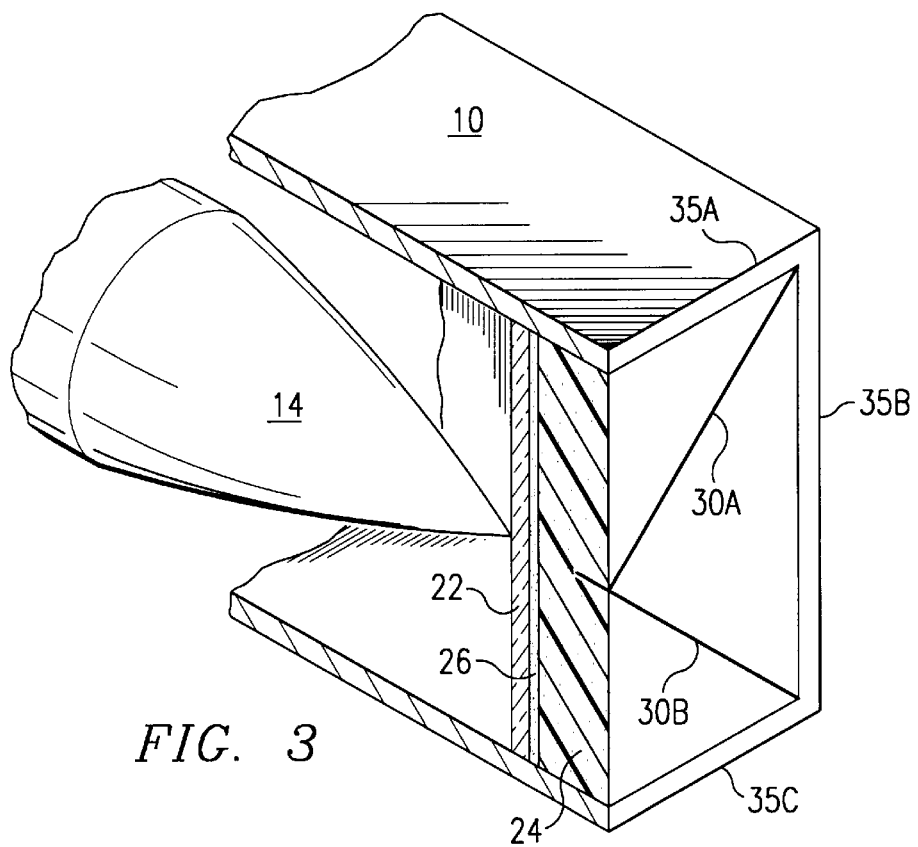
FIG. 3 is a perspective view of the nose portion of the munition and a cross sectional view of the canister cover.

The foam layer 24 preferably has score marks, or weakened lines of severance along which the foam layer 24 can readily break, as shown in FIG. 3. FIG. 3 is a perspective view of the nose 14 of munition 12 and a cut-away view of the canister 10 and front cover 16. Score marks 30A and 30B are shown cut into the outer face of the foam layer 24. The score marks can be made by cutting the foam along predetermined lines, with the cuts being preferably approximately half way through the thickness of the foam layer 24. Such cut score marks typically have a V-shaped cross section. Alternatively, the foam layer 24 can be cast in forms that will mold the score marks in the foam layer 24. The shape of the form used will dictate the cross-sectional shape of the score mark, which could accordingly have a variety of cross-sections, e.g. U-shaped, V-shaped, or square shaped. The purpose of the score marks is to weaken portions of the foam layer 24 such that it can readily break along the score marks into large pieces having a predetermined size and shape upon munition launch and after the tempered glass is shattered. Any number of patterns of score marks may be used to accomplish this purpose. Although the score marks are shown on the outside face of the foam layer 24, alternatively they can be made on the inner surface of the foam layer 24.

FIGS. 6A–6C show examples of different score patterns that can be used to weaken portions of the foam layer 24 such that it will readily break into a predetermined number, size and shape of pieces upon munition launch. The score pattern used in a preferred embodiment of the present invention is shown in FIG. 6A, the score pattern having score marks 30A and 30B. Score mark 30A is a continuous score line extending from one corner 31B of the foam layer 24 to a diagonally opposing corner 31D of the foam layer 24. Similarly, score mark 30B is a continuous score line from corner 31A of the foam layer 24 to diagonally opposing corner 31C of the foam layer 24. The score marks 30A and 30B intersect at substantially right angles in the proximity of the center of the foam layer 24. The scores marks 30A and 30B thus allow the foam layer 24 to readily break into four approximately equally-sized triangular pieces.

FIGS. 6B and 6C show alternative score patterns. The score pattern shown in FIG. 6B is comprised of two sets of lines, with the first set comprised of lines 32A and 32B, and the second set comprised of lines 32C and 32D. Lines 32A and 32B are parallel to each other and spaced apart from each other, and extend diagonally from one corner 31A of the foam layer 24 to a diagonally opposing corner 31C of the foam layer 24. Lines 32A and 32B do not intersect the cusp of corners 31A and 31C but instead are spaced laterally from and on either side of the corners 31A and 31C. Similarly, Lines 32C and 32D are parallel to each other and spaced apart from each other. They extend diagonally from one corner 31B of the foam layer 24 to a diagonally opposing corner 31D of the foam layer 24. Lines 32C and 32D do not intersect the cusp of corners 31B and 31D but instead are spaced laterally apart from and on either side of the cusp of corners 31B and 31D. Lines 32A and 32B intersect lines 32C and 32D at substantially right angles. The foam cover shown in FIG. 6B would thus break into nine pieces. The cover shown in FIG. 6C is comprised of a first set of parallel lines 33A extending from side 34B of the foam layer 24 to opposing side 34D of the foam layer 24, and a second set of parallel lines 33B extending from side 34A of the foam layer 24 to opposing side 34C of the foam layer 24, with the first set of lines 33A being generally perpendicular to the second set of lines 33B. The number of lines in each set of lines 33A and 33B can be appropriately selected such that foam layer 24 will break into one-inch squares upon munition launch.

The score patterns shown in FIGS. 6A–6C are examples of score patterns that may be used in accordance with the present invention. Numerous other score patterns can be suitably used while accomplishing the objective of constructing a canister cover that protects the munition contained in the canister and that also readily breaks into pieces having a size that allows the munition to egress unimpeded and undamaged from the canister upon munition launch. In general, the shape of the cover will be dictated by the shape of the canister. Thus, the covers shown in FIGS. 6A–6C have a generally square shape, corresponding to the shape of the canister 10 shown in FIG. 3, the canister 10 having four sidewalls 35A–35D (35D not visible; 35B and 35C partially visible). Other shapes for the cover may be suitably employed depending on the shape of the canister.

Referring again to FIG. 3, upon launch of the munition 12, the nose 14 of the munition 12 impacts the glass layer 22 which then shatters into small fragments. However, because the glass layer 22 is bonded to foam layer 24 by the adhesive layer 26, the glass fragments remain bonded to the foam layer 24 such that the glass layer 22 remains substantially in place even though it has been broken into numerous pieces. As the munition 12 continues its egress from the canister 10, the foam layer 24 breaks along score marks 30A and 30B into four triangular pieces. These foam pieces have numerous glass fragments from corresponding portions of the glass layer 22 attached thereto via the adhesive film 26. Each of these foam pieces, having numerous glass fragments bonded thereto, are pushed out of the canister 10 and away from the exiting munition 12 by the impact force of the nose 14 of the munition 12 and gas pressures from the launch.

The combination of layers 22, 24, and 26 thus accomplishes the purpose of providing a canister cover that is durable, protects the munition from environmental conditions, and is easily removed upon launch without damaging the munition or impeding the egress of the munition upon munition launch. Outer foam layer 24 protects the munition and inner glass layer from external environmental conditions and from external impacts to the canister. A point force applied to the foam layer 24 is dispersed by the foam layer so that the resulting force on the glass layer 22 is a reduced force per unit area. Inner glass layer 22 provides additional environmental protection for the munition and improves the strength, rigidity and durability of the cover. Furthermore, the glass layer 22 easily shatters upon impact of the munition during launch while the foam and adhesive layers maintain the broken glass fragments in large pieces that are blown out and away from the munition during launch, as described above.

Figure 4:
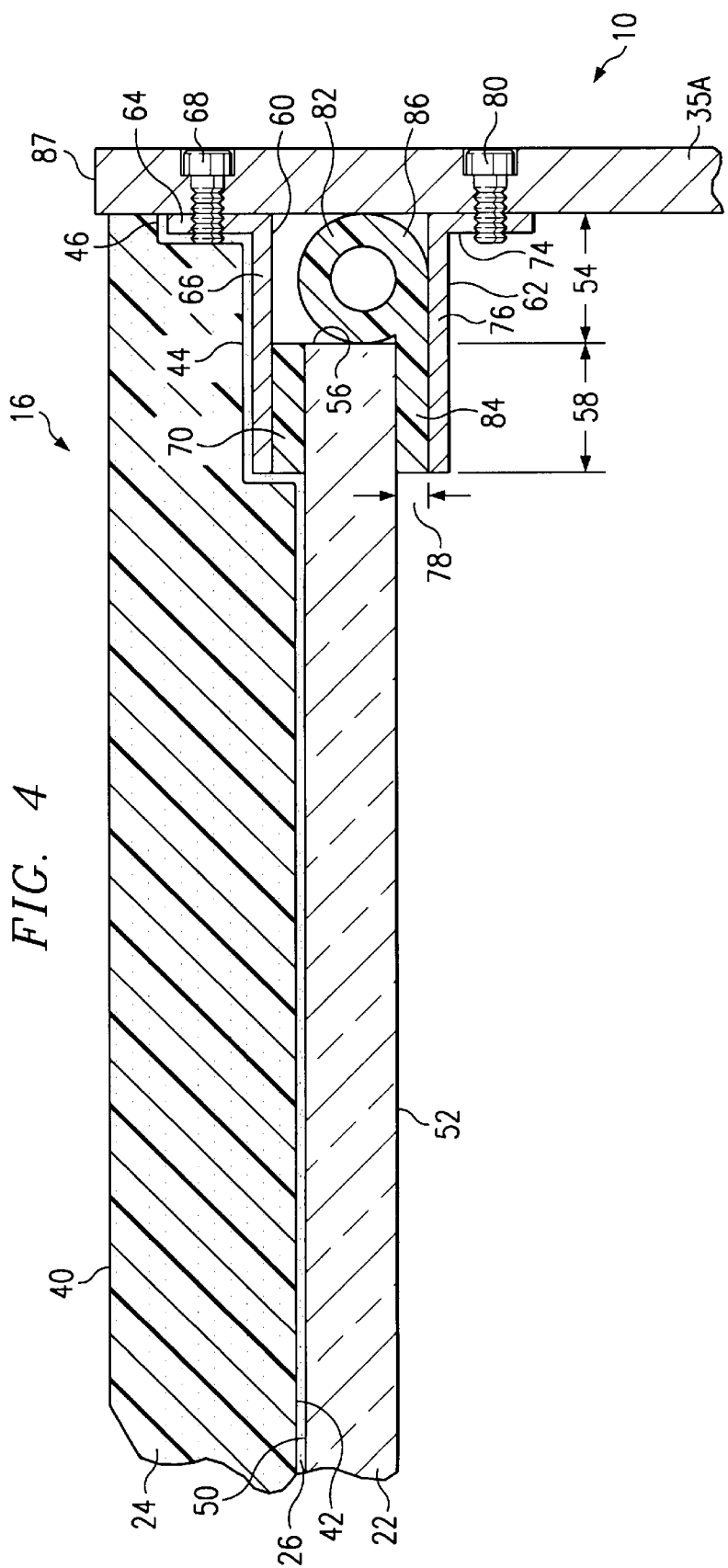
FIG. 4 is an attachment assembly for attaching a canister cover to a canister.

The above described canister cover 16 can be attached to a canister 10 in a variety of ways. FIGS. 4 and 5 show two example attachments for securing the cover 16 to the canister 10. FIG. 4 is a cross sectional view of the canister 10 and cover 16 along a plane that is perpendicular to the cover 16 and the sidewall 35A of the canister 10. Foam layer 24 has an outer or top surface 40 and an inner or bottom surface 42. The bottom surface 42 has an indentation 44 that extends radially outwardly from the sidewall 35A of the canister 10. The foam layer 24 also has an annular gap 46 adjacent to and extending along the sidewall 35A. Both the gap 46 and the indentation 44 can be created by compressing the foam layer 24, by removing portions of the foam layer 24, or by casting the foam using a mold that has a corresponding shape such that the gap 46 and indentation 44 are formed in the foam layer 24.

Glass layer 22 has a top surface 50 and a bottom surface 52. The dimensions of the glass layer 22 are smaller than that of the foam layer 24, resulting in a lateral offset 54 between the outer edge 56 of the glass layer 22 and the sidewall 35A. Substantially all of the top surface 50 of the glass layer 22 is bonded to substantially all of the bottom surface 42 of the foam layer 24 by adhesive layer 26. An outer portion 58 of the top surface 50 of the glass layer 22 is positioned beneath the indentation 44 of the foam layer 24 and, accordingly, this outer portion 58 of the top surface 50 of the glass layer 22 is not bonded to the bottom surface 42 of the foam layer 24. However, the adhesive layer 26 can extend along the entire bottom surface 42 of the foam layer 24, including along the edges of indentation 44 and gap 46.

Two brackets 60 and 62 are used to attach the cover 16 to sidewall 35A. Bracket 60 is preferably L-shaped, having a first leg 64 that is adjacent to and extends along the sidewall 35A, and a second leg 66 that extends radially inwardly from sidewall 35A toward the longitudinal axis of the canister 10 and that is perpendicular to the first leg 64 and the sidewall 35A. The first leg 64 is positioned within and occupies the gap 46 between the foam layer 24 and the sidewall 35A. The second leg 66 is positioned within, and occupies a portion of, the indentation 44 in the bottom surface 42 of the foam layer 24. The layer of adhesive 26 bonds the first leg 64 and the second leg 66 of the bracket 60 to the foam layer 24. A screw 68, which extends radially through sidewall 35A and into the first leg 64 of the bracket 60, attaches the bracket 60 to the sidewall 35A of the canister 10. Alternatively, the first leg 64 of the bracket 60 could be bonded to the sidewall 35A by an adhesive layer. A cushioning layer 70, preferably made of a flat silicone gasket, is compressed between the second leg 66 of the bracket 60 and the outer portion 58 of the top surface 50 of the glass layer 22. This cushioning layer 70 also occupies a portion of the indentation 44. The cushioning layer 70 prevents the second leg 66 of the bracket 60, which is preferably made of metal, from contacting the glass layer 24, which contact could cause the glass layer 24 to break.

The second bracket 62 is preferably L-shaped, having a first leg 74 that is adjacent to and extends along the sidewall 35A, and a second leg 76 that extends radially inwardly from sidewall 35A toward the longitudinal axis of the canister 10 and that is perpendicular to the first leg 74 and the sidewall 35A. The first leg 74 is positioned below, and extending radially away from, the lateral offset 54 between the outer edge 56 of the glass layer 22 and the sidewall 35A. The second leg 76 is positioned below, and spaced by a gap 78, apart from, the lateral offset 54 and a portion of the bottom surface 52 of the glass layer 22. A screw 80, which extends radially through sidewall 35A and into the first leg 74 of the bracket 62, attaches the bracket 62 to the sidewall 35A of the canister 10. Alternatively, the second leg 76 could be bonded to the sidewall 35A by an adhesive layer. A cushioning and sealing layer 82, preferably made of a silicone gasket having a flat portion 84 and a round portion 86, is positioned such that the flat portion 84 is positioned in the gap 78 between the bottom surface 52 of the glass layer 22 and the second leg 76 of the bracket 62, and the round portion 86 is positioned in the lateral offset 54 between the outer edge 56 of the glass layer 22 and the sidewall 35A. The flat portion 84 prevents the second leg 76 of the bracket 62, which is preferably made of metal, from contacting the bottom surface 52 of the glass layer 24, thereby minimizing the transfer of an impact force on the canister 10 to the glass layer 22 which could otherwise cause the glass layer 24 to break. The round portion 86 provides a gas seal between the glass layer 24 and sidewall 35A of the canister 10. The cover 16 is attached to the canister 10 in the above described manner such that the top surface 40 of the foam layer 24 is generally flush with the outer edge 87 of the canister 10.

In one embodiment of the attachment shown in FIG. 4, the indentation 44 and gap 46 extend annularly around the outer periphery of the foam layer 24. In such an embodiment, the outer portion 58 of the top surface 40 of the glass layer 22 positioned beneath the indentation 44 of the foam layer 24 would also extend annularly around the outer periphery of the glass layer 22. Similarly, the lateral offset 54 between the side edge 56 of the glass layer 22 and sidewall 35A would extend along sidewall 35A, and furthermore along sidewalls 35B–35D (not shown) such that the lateral offset 54 extends annularly around the entire annularly extending outer edge 56 of the glass layer 22. The cushioning layer 70, positioned within the indentation 44 would also extend annularly around the annularly extending outer portion 58 of the top surface 50 of the glass layer 22. The flat portion 84 of the cushioning and sealing layer 82, the flat portion 84 being positioned in the gap 78 between the bottom surface 52 of the glass layer 22 and the second leg 76 of the bracket 62, would also extend annularly around the bottom surface 52 of the glass layer 22. The round portion 86 of the cushioning and sealing layer 82, positioned in the lateral offset 54, would extend annularly around the outer edge 56 of the glass layer 22. The brackets 60 and 62 can similarly extend annularly around the sidewalls 35A–D of the canister 10, with an appropriate number of screws such as screws 68 and 80, or an adhesive, being used to adequately secure the brackets 60 and 62 to the sidewalls 35A–35D. Alternatively, the brackets 60 and 62 can be discrete components that do not extend annularly around the sidewalls 35A–35D but instead only extend laterally along a portion of one or more of the sidewalls. In such an embodiment, additional brackets such as brackets 60 and 62 can be used to attach each side of the cover 16 to a corresponding sidewall 35A–35D of the canister 10.

FIG. 5 is an alternative example of an attachment for securing the cover 16 to the canister 10. FIG. 5 is a cross sectional view of the canister 10 and cover 16 along a plane that is perpendicular through the cover 16 and sidewall 35A of the canister 10. Foam layer 24 has a top surface 100 and a bottom surface 102. The bottom surface 102 has an indentation 104 that extends radially inwardly from the sidewall 35A toward the longitudinal axis of the canister 10. The indentation 104 furthermore extends annularly around the outer periphery of the entire foam layer 24. The indentation 104 can be created by compressing the foam layer 24, by removing portions of the foam layer 24, or by casting the foam using a mold that has a corresponding shape such that the indentation 104 is formed in the foam layer 24. Glass layer 22 has a top surface 110 and a bottom surface 112. The dimensions of the glass layer 22 are smaller than that of the foam layer 24, resulting in a lateral offset 114 between the outer edge 116 of the glass layer 22 and the sidewall 35A. The lateral offset 114 extends annularly around the entire outer periphery of the glass layer 22. Substantially all of the top surface 110 of the glass layer 22 is bonded to the bottom surface 112 of the foam layer 24 by adhesive layer 26. An outer portion 118 of glass layer 22 is positioned beneath the indentation 104 of the foam layer 24 and extends annularly around the entire outer periphery of the glass layer 22. Because of its position with respect to the indentation 104, the top surface 120 of this outer portion 118 of the glass layer 22 is not bonded to the bottom surface 102 of the foam layer 24. However, the adhesive layer 26 extends along the entire bottom surface 102 of the foam layer 24, including along the edges of the indentation 104.

Frame 122 has an I-shaped cross section such that the frame 122 is comprised of a central portion 124, an inner channel 126, an outer channel 128, an upper support 130 and a lower support 132, with the upper and lower supports 130 and 132 being wider than the central portion 124 to thereby form the channels 126 and 128 therebetween. Frame 122 extends annularly around the sidewalls 35A–D of the canister 10. The upper support 130 of the frame 122 is positioned within the indentation 104 of the foam layer 24 and is bonded to the bottom surface 102 of the foam layer 24 by adhesive layer 26. The width of the upper support 130 is slightly smaller than the width of the indentation 104 such that a small gap 134 results between an outer edge 136 the upper support 130 and the sidewall 35A. Similarly, because the width of the lower support 132 is substantially equal to the width of the upper support 130, a small gap 138 results between an outer edge 140 of the lower support 132 and the sidewall 35A. An adhesive 142 is applied within the small gap 134 in order to bond the outer edge 136 of the upper support 130 to the sidewall 35A, thus securing the frame 122 to the canister 10. The lower support 132 of the frame 122 is positioned below the bottom surface 112 of the glass layer 24 and overlaps the outer portion 118 of the glass layer 22. The outer portion 118 of the glass layer 22 extends into the inner channel 126, but does not occupy the entire inner channel 126. Instead, a cushioning layer 144, preferably made of silicone, is positioned around the outer portion 118 of the glass layer 22 and between the outer portion 118 of the glass layer 22 and the surfaces of the inner channel 126. The cushioning layer 144 extends annularly around the outer edge of the entire glass layer 22. This cushioning layer 144 prevents the frame 122, which is preferably made of metal, from contacting the glass layer 22, thereby minimizing the transfer of an impact force on the canister 10 to the glass layer 22 which could otherwise cause the glass layer 22 to break. A sealing layer 146, having a circular cross section, is positioned within the outer channel 128 of the frame 122. The sealing layer 146 is sized so that it contacts the sidewall 35A and the surface 148 of the outer channel 128, and the sealing layer 146 extends annularly around the sidewalls 35A–D of the canister 10. This sealing layer 146 provides a gas seal between the sidewalls 35A–D of the canister 10 and the cover 16. The cover 16 is attached to the canister 10 in the above described manner such that the top surface 100 of the foam layer 24 is generally flush with the outer edge 87 of the canister 10.

While FIG. 4 shows an example of attachment for securing the cover 16 to the canister 10, other suitable attachments can be employed. For example, the cover 16 can be bonded directly to the outer edge 87 of the canister 10 by applying a layer of adhesive around the outer periphery of the bottom surface of the glass layer 22 and then bonding the cover to the outer edge 87 of the canister 10 around the periphery of the canister 10. Or, a layer of adhesive can be applied around the outer edges of the cover 16, which is sized to fit within the canister 10 such that the outer edges of the cover 16 are in frictional contact with sidewalls 35A–D of the canister 10. Then, the cover 16 can be inserted into the canister 10 and the adhesive allowed to bond the outer edge of the cover 16 to the sidewalls 35A–D of the canister 10.

Reasonable other variations and modifications of the above described canister cover are possible within the scope of the foregoing description, the drawings, and the appended claims to the invention.

What is claimed is:

1. A canister assembly for containing a munition until munition launch, said canister assembly comprising:

a hollow canister having an open end, the canister being adapted to receive a munition therein; and a cover for sealing the open end of said canister, the cover being a laminate comprising: a glass layer having first and second surfaces; a structural foam layer having first and second surfaces; and an adhesive layer in contact with the first surface of said glass layer and the first surface of said foam layer, whereby said adhesive layer bonds the first surface of said structural foam layer to the first surface of said glass layer, the cover being positioned such that the second surface of said structural foam layer faces outwardly away from the open end of said canister and the second surface of said glass layer faces inwardly toward the interior of said canister, whereby said cover seals the open end of said hollow canister to thereby seal a munition within said canister until munition launch, whereupon said cover can break out and away from said canister to thereby allow the munition to egress from said canister.

2. A canister assembly in accordance with claim 1, wherein said glass layer is comprised of tempered glass, whereby said glass layer can fragment into numerous pieces upon launch of a munition contained within said hollow canister, the numerous pieces of said glass layer remaining bonded to said structural foam layer by said adhesive layer.

3. A canister assembly in accordance with claim 2, wherein said structural foam layer has at least one score mark therein, whereby said structural foam layer can break along said at least one score mark into two or more pieces upon launch of a munition contained within said hollow canister, each of the two or more pieces of said foam layer having pieces of said glass layer bonded thereto by said adhesive layer.

4. A canister assembly in accordance with claim 1, wherein the first surface of said glass layer is generally parallel to the second surface of said glass layer, and wherein the first surface of said structural foam layer is generally parallel to the second surface of said structural foam layer and the first surface of said structural foam layer is generally parallel to the first surface of said glass layer.

5. A canister assembly in accordance with claim 1, wherein the canister has inner walls surrounding the interior of said canister, and the cover has an annular outer edge surface, the canister assembly further comprising a second adhesive layer adjacent to the outer edge surface of said cover and adjacent to a portion of the inner walls of said canister to thereby secure said cover to said canister.

6. A canister assembly in accordance with claim 1, wherein the canister has an outer edge surrounding the open end of said canister, and the canister assembly further comprises a second adhesive layer adjacent to the outer edge of said canister and adjacent to a portion of the second surface of said glass layer to thereby bond said cover to said canister.

7. A canister assembly in accordance with claim 1, wherein said canister assembly is further comprised of one or more brackets for securing said cover to said canister.

8. A canister assembly in accordance with claim 7, wherein said canister assembly is further comprised of an annular frame that surrounds the perimeter of said cover, said one or more brackets securing said annular frame to said canister to thereby secure said cover to said canister.

9. A canister assembly in accordance with claim 1, wherein said structural foam layer has a plurality of score marks therein, wherein at least one of said score marks intersects at least one other score mark so as to divide said structural foam layer into a plurality of portions which are readily separable from each other when said structural foam layer is broken along said score marks.

10. A canister assembly in accordance with claim 1, wherein said structural foam layer contains at least two score lines formed therein, each of the score lines extending across said laminate from one respective edge of said laminate to an opposite edge of said laminate, at least one of said score lines intersecting at least one other of said score lines.

11. A canister assembly for containing a munition until munition launch, said canister assembly comprising:

a hollow canister having an open end, the canister being adapted to receive a munition therein;

a cover for sealing the open end of said canister, the cover comprising: a tempered glass layer having first and second surfaces, the first surface of the tempered glass layer being parallel to the second surface of the tempered glass layer; an adhesive layer adjacent to the first surface of said tempered glass layer; and a structural foam layer having first and second surfaces, the first surface of the structural foam layer being parallel to the second surface of the structural foam layer, the first surface of the structural foam layer also being adjacent to said adhesive layer and generally parallel to the first surface of said tempered glass layer, the structural foam layer having at least one score mark therein, whereby said adhesive layer bonds the first surface of said structural foam layer to the first surface of said tempered glass layer, the cover being positioned such that the second surface of said structural foam layer faces outwardly away from the open end of said canister and the second surface of said tempered glass layer faces inwardly toward the interior of said canister; and one or more brackets for securing said cover to said canister such that said cover seals the open end of said canister to thereby seal a munition within said canister until munition launch, whereupon the tempered glass layer fragments into numerous pieces that remain bonded to said structural foam layer by said adhesive layer, and said structural foam layer breaks along said at least one score mark into two or more pieces having pieces from said tempered glass layer bonded thereto, the two or more pieces of said structural foam layer, having pieces from said tempered glass layer bonded thereto, moving away from the opening of said canister to thereby allow the munition to egress unimpeded from said canister.

12. A method of sealing a munition canister until munition launch, the munition canister being a hollow container adapted for containing a munition therein, said munition canister also having an open end for allowing egress of the munition upon munition launch, said method comprising:

sealing the munition within said munition canister by covering the open end of said munition canister with a cover, the cover being a laminate comprising: a glass layer having first and second surfaces; a structural foam layer having first and second surfaces; and an adhesive layer in contact with the first surface of said glass layer and the first surface of said foam layer such that said adhesive layer bonds the first surface of said structural foam layer to the first surface of said glass layer;

breaking the glass layer into numerous pieces upon munition launch, the numerous pieces of the glass layer remaining bonded to the first surface of the structural foam layer by the adhesive layer;

breaking the structural foam layer into two or more pieces each having pieces of the glass layer bonded thereto by the adhesive layer; and removing the two or more pieces of the structural foam layer, having pieces of the glass layer bonded thereto, from the proximity of the munition such that the munition can egress unimpeded from the munition canister.

13. A method in accordance with claim 12, wherein said glass layer is comprised of tempered glass.

14. A method in accordance with claim 12, wherein said structural foam layer has at least one score mark therein, whereby the structural foam layer breaks along said at least one score mark during said step of breaking the structural foam layer.

15. The method of claim 12, wherein the first surface of said glass layer is generally parallel to the second surface of said glass layer, and wherein the first surface of said structural foam layer is generally parallel to the second surface of said structural foam layer and the first surface of said structural foam layer is generally parallel to the first surface of said glass layer.

16. The method of claim 12, wherein said structural foam layer has a plurality of score marks therein, wherein at least one of said score marks intersects at least one other score mark so as to divide said structural foam layer into a plurality of portions which are readily separable from each other when said structural foam layer is broken along said score marks.

17. The method of claim 12, wherein said structural foam layer contains at least two score lines formed therein, each of the score lines extending across said laminate from one respective edge of said laminate to an opposite edge of said laminate, at least one of said score lines intersecting at least one other of said score lines.

18. A method of sealing a munition canister until munition launch, the munition canister being a hollow container adapted for containing a munition therein, said munition canister also having an open end for allowing egress of the munition upon munition launch, said method comprising:

sealing the munition within said munition canister by covering the open end of said munition canister with a cover, the cover comprising: a tempered glass layer having first and second surfaces, the first surface of the tempered glass layer being parallel to the second surface of the tempered glass layer; a structural foam layer having first and second surfaces, the first surface of the structural foam layer being parallel to the second surface of the structural foam layer and generally parallel to the first surface of the tempered glass layer, the structural foam layer having at least one score mark therein; and an adhesive layer in contact with the first surface of the structural foam layer and the first surface of the glass layer such that the adhesive layer bonds the first surface of the structural foam layer to the first surface of the tempered glass layer;

breaking the tempered glass layer into numerous pieces upon munition launch, the numerous pieces of the tempered glass layer remaining bonded to the first surface of the structural foam layer by the adhesive layer;

breaking the structural foam layer along the at least one score marks into two or more pieces each having pieces of the tempered glass layer bonded thereto by the adhesive layer; and removing the two or more pieces of the structural foam layer, each having pieces of the glass layer bonded thereto, from the proximity of the munition such that the munition can egress unimpeded from the munition canister.

19. A method of launching a munition sealed within a canister, the canister being hollow and having an open end sealed by a cover, the cover comprising: a tempered glass layer having first and second surfaces, the first surface of the tempered glass layer being parallel to the second surface of the tempered glass layer; a structural foam layer having first and second surfaces, the first surface of the structural foam layer being parallel to the second surface of the structural foam layer and generally parallel to the first surface of the tempered glass layer, the structural foam layer having at least one score mark therein; and an adhesive layer in contact with the first surface of the structural foam layer and the first surface of the glass layer such that the adhesive layer bonds the first surface of the structural foam layer to the first surface of the tempered glass layer, the method comprising:

breaking the tempered glass layer into numerous pieces, the numerous pieces of the tempered glass layer remaining bonded to the first surface of the structural foam layer by the adhesive layer, the breaking of the tempered glass layer being caused by the egress of the munition from the canister;

breaking the structural foam layer along the at least one score mark into two or more pieces each having pieces of the tempered glass layer bonded thereto by the adhesive layer, the breaking of the structural foam layer being caused by the egress of the munition from the canister; and removing the two or more pieces of the structural foam layer, each having pieces of the glass layer bonded thereto, from the proximity of the munition such that the munition can egress unimpeded from the munition canister, the removing of the two or more pieces of the structural foam layer being caused by pressures generated by launch of the munition.

* * * * *

UNITED STATES PATENT AND TRADEMARK OFFICE
CERTIFICATE OF CORRECTION

PATENT NO. : 5,993,921        Page 1 of 1
DATED : November 30, 1999
INVENTOR(S) : David Lynn Hunn It is certified that error appears in the above-identified patent and that said Letters Patent is hereby corrected as shown below:

Column 7,
Line 16, 18, and 20, delete "24" and insert -- 22 --.
Line 27, delete "40" and insert -- 50 --.

Column 8,
Line 12, delete "112" and insert -- 102 --.
Line 44, delete "24" and insert -- 22 --.

Column 9,
Line 1, delete "FIG.4 shows an example of attachment" and insert -- Figures 4 and 5 show examples of attachments --.

Column 11,
Claim 12, Line 12, after the first instance of "said", insert -- structural --.
Claim 15, Line 34, delete "The method of" and insert -- A method in accordance with --.
Claim 16, Line 42, delete "The method of" and insert -- A method in accordance with --.
Claim 17, Line 49, delete "The method of" and insert -- A method in accordance with --.

Column 12,
Claim 18, Line 19, delete "marks" insert -- mark --.

Signed and Sealed this

Twenty-eighth Day of August, 2001

*Attest:*

NICHOLAS P. GODICI
*Attesting Officer*     Acting Director of the United States Patent and Trademark Office